(12) United States Patent
Kobayashi

(10) Patent No.: US 8,335,400 B2
(45) Date of Patent: Dec. 18, 2012

(54) INFORMATION PROCESSING METHOD AND INFORMATION PROCESSING APPARATUS

(75) Inventor: Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 986 days.

(21) Appl. No.: 12/294,324

(22) PCT Filed: Mar. 23, 2007

(86) PCT No.: PCT/JP2007/057028
§ 371 (c)(1),
(2), (4) Date: Sep. 24, 2008

(87) PCT Pub. No.: WO2007/114313
PCT Pub. Date: Oct. 11, 2007

(65) Prior Publication Data
US 2009/0245681 A1    Oct. 1, 2009

(30) Foreign Application Priority Data

Mar. 31, 2006   (JP) .................................. 2006-100382

(51) Int. Cl.
*G06K 9/36*   (2006.01)

(52) U.S. Cl. ........ 382/276; 382/101; 382/102; 382/103; 382/162; 382/165; 382/282; 382/306; 358/1.9; 358/534

(58) Field of Classification Search .................. 382/276, 382/101, 102, 103, 162, 165, 282, 306; 358/1.9, 358/534
See application file for complete search history.

(56) References Cited

U.S. PATENT DOCUMENTS

| 5,974,171 A * | 10/1999 | Hayashi et al. ................ 382/162 |
| 2002/0052709 A1 * | 5/2002 | Akatsuka et al. ............. 702/153 |
| 2005/0008256 A1 | 1/2005 | Uchiyama et al. |
| 2007/0133841 A1 * | 6/2007 | Zhang et al. ................... 382/103 |
| 2009/0109453 A1 * | 4/2009 | Nakahara ....................... 358/1.9 |

FOREIGN PATENT DOCUMENTS

| JP | 11-084307 A | 3/1999 |
| JP | 2000-41173 A | 2/2000 |
| JP | 2005-033319 A | 2/2005 |

(Continued)

OTHER PUBLICATIONS

Yamashita et al., On the M-CubITS Pedestrian Navigation System by a Camera-Equipped Mobile Phone, The papers of Joint Technical Meeting on Transportation and Electric Railway and Intelligent Transport System, IEE Japan, Mar. 1, 2004, pp. 21-25, vol. TER-04, No. 1-9 (Japanese text with English abstract).

(Continued)

*Primary Examiner* — Mike Rahmjoo
(74) *Attorney, Agent, or Firm* — Carter, DeLuca, Farrell & Schmidt LLP

(57) ABSTRACT

Markers are laid out to express a predetermined code string by a plurality of continuous markers. The markers which form a marker string include at least two types of markers having different features which can be identified by image processing. Markers detected in the captured image are converted into numerical information, and are collated based on the numerical information and the predetermined code string. Using information associated with the markers, the coordinate information of each collated marker is calculated. The position and orientation of an image capturing device are calculated using the coordinate information. With a simple arrangement, the position and orientation of an image capturing device can be calculated.

10 Claims, 7 Drawing Sheets

FOREIGN PATENT DOCUMENTS

| | | |
|---|---|---|
| JP | 2005-326282 A | 11/2005 |
| JP | 2005-337870 A | 12/2005 |
| JP | 2007-010335 A | 1/2007 |

OTHER PUBLICATIONS

International Preliminary Report issued on Jun. 12, 2007 for International Application No. PCT/JP2007/057028.

W. A. Hoff and K. Nguyen, "Computer vision-based registration techniques for augmented reality", Proc. SPIE, vol. 2904, pp. 538-548, Nov. 1996.

U. Neumann and Y. Cho, "A self-tracking augmented reality system", Proc. VRST '96, pp. 109-115, Jul. 1996.

Junichi Rekimoto, "Constructing augmented reality system using the 2D matrix code", Interactive system and software IV, Kindai Kagaku sha, pp. 199-208, Dec. 1996. [in Japanese] Corresponding to Item 7.

Jun Rekimoto, "Matrix: A Realtime Object Identification and Registration Method for Augmented Realty", Proc. of Asia Pacific Computer Human Interaction (APCHI '98), 1998.

"An experimental study of the positioning by M-CubITS" IEICE Technical Report, Japan, The Institute of Electronics Information and Communication Engineers, vol. 103, No. 643, pp. 49-54, Jeyeon Kim, et al., Published Jan. 27, 2004.

Japanese Office Action issued Mar. 9, 2012, concerning the basic Japanese Patent Application No. 2006-100382.

\* cited by examiner

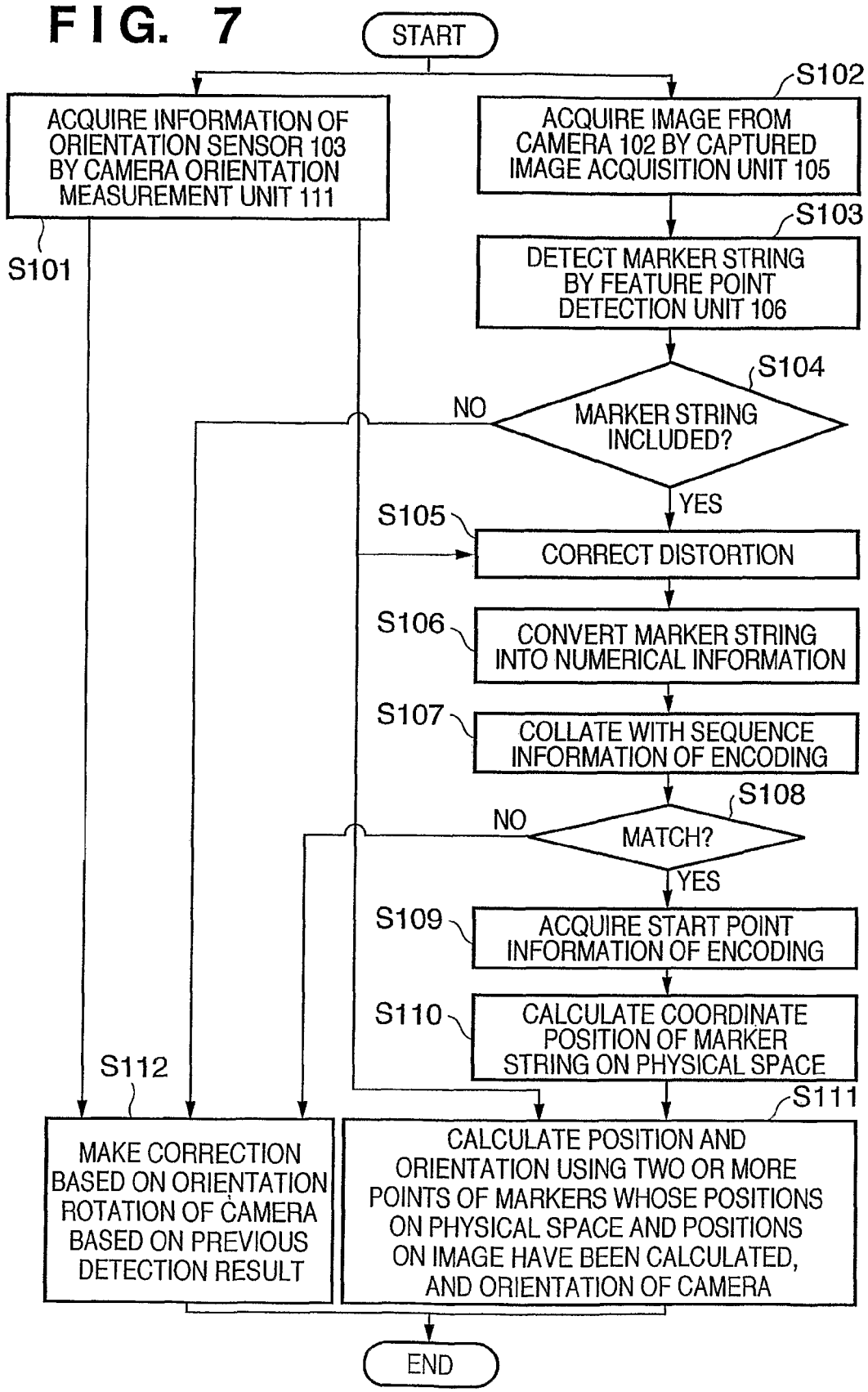

INFORMATION PROCESSING METHOD AND INFORMATION PROCESSING APPARATUS

TECHNICAL FIELD

The present invention relates to an information processing method and information processing apparatus and, more specifically, to an information processing method and information processing apparatus, which calculate position and orientation using a captured image and markers on a physical space.

BACKGROUND ART

Position and orientation measurement of an image capturing device (to be referred to as a camera as needed hereinafter) such as a camera or the like used to capture a physical space is required in a mixed reality (MR) system which blends and presents a physical space and virtual space.

As a method of measuring the position and orientation of a camera in the physical space, a method of attaching a position and orientation sensor such as a magnetic sensor or the like to the camera is available (to be referred to as method 1 hereinafter).

In the MR technique, it is desirable that no deviation be allowed to exist between the position of an object (physical object) which exists in the physical space and that of an object (virtual object) rendered by computer graphics or the like. Japanese Patent Laid-Open No. 11-084307 (D1) and Japanese Patent Laid-Open No. 2000-041173 (D2) disclose a technique for correcting the measurement errors of the position and orientation sensor used in method 1 using a captured image of the physical space.

The methods disclosed in D1 and D2 are common in that markers whose positions are given are laid out on the physical space, and sensor errors are corrected using information from markers included in the image captured by the camera although they have different calculation principles, means, and processes. More specifically, the position and orientation of the camera are calculated based on information obtained from a six degrees of freedom (6DOF) position and orientation sensor used to measure the position and orientation of the camera, information from markers laid out in the physical space, and information obtained by capturing these markers using the camera (to be referred to as method 2 hereinafter).

As disclosed in

W. A. Hoff and K. Nguyen, "Computer vision-based registration techniques for augmented reality", Proc. SPIE, Vol. 2904, pp. 538-548, November 1996 (D3), U. Neumann and Y. Cho, "A self-tracking augmented reality system", Proc. VRST '96, pp. 109-115, July 1996 (D4), Junichi Rekimoto, "Constructing augmented reality system using the 2D matrix code", Interactive system and software IV, Kindai kagaku sha, pp. 199-208, December 1996 (D5), and the like, many methods for calculating the position and orientation of a camera based only on information obtained by using the camera to capture markers present in the physical space have been implemented. In order to calculate the position and orientation of the camera, three or more marker points that are not located on an identical line are required, as described in D2. Methods of capturing three or more marker points which are not located on an identical line by a camera, and calculating the position and orientation of the camera based on the coordinates of detected markers in the captured image will be collectively referred to as method 3.

Method 3 is advantageous in terms of cost, since it uses only the camera without using any expensive 6DOF position and orientation sensor. However, in order to measure the position and orientation of the camera, three or more marker points that are not located on an identical line must be captured.

Japanese Patent Laid-Open No. 2005-33319 (D6, U.S. Patent Publication No. 2005/0008256) discloses a method of estimating the position and orientation of a camera using an orientation detection sensor and marker information detected in an image. With the method described in D6, when three or more marker points are detected, the position and orientation of the camera can be accurately calculated by repetitive operations. When one or two points of markers are detected, translations or rotation components of the position and orientation are corrected using the previous position and orientation estimation results. In this way, if the number of detected markers is less than three, accurate position and orientation measurement can be obtained effectively using information from the orientation detection sensor.

In recent years, gyro or acceleration sensors have improved in performance, and can accurately detect an orientation. Therefore, using these sensors, a tilt in the gravitational direction and an azimuth in the direction of earth axis can be accurately obtained. Since method 3 measures the position and orientation using only the camera, three or more points which are not laid out on an identical line on the physical space must be detected in a captured image. However, when the orientation of the camera is detected by the sensor and only the position is calculated from markers, only two marker points need be detected. Also, the two points can be two ends of a line segment. In order to easily detect correspondence between the captured markers and actual markers, it is a common practice to use different colors or patterns in markers.

In order to detect correspondence between markers, a plurality of pieces of information required to identify individual markers can be introduced using encoded information in an element which forms each marker. As such encoded information, a barcode, QR code, and the like are generally known. As a method that can continuously form such information linearly, a method using a pseudo random number sequence (PN sequence) generated based on an Maximum Length Sequence (MLS) is known. Furthermore, many methods of obtaining a relative position using the Maximum Length Sequence (MLS) have been proposed as position detection methods. The Maximum Length Sequence (MLS) allows calculation of the number of times, a pseudo random number generator has been executed by using the point at which the correlation of a sequence generated using pseudo random number generator signals becomes greatest. Hence, if a sequence greater than or equal to a standard length required to generate the Maximum Length Sequence (MLS) can be obtained, the relative position can be calculated.

When applying the MR technique to in-house navigation or the like, such a technique normally superimposes the next direction to go in on the image of the physical space. In this case, if the orientation measurement precision of the camera is low, because the image that indicates the direction may not indicate a correct direction, improvement of the orientation measurement precision is important.

Furthermore, since GPS is not available underground or inside buildings, it is difficult to directly apply car navigation mechanisms to navigation in in-house movement over a broad range underground or inside buildings.

It is difficult for 6DOF sensors, which detect position and orientation by detecting magnetism, to obtain sufficiently high precision over a broad range due to the influence of obstacles such as metal and the like, and various means for improving their precision have been proposed. Of such means, method 2 has been proposed as a means for minimizing errors by minimizing the positional deviation from an actual captured image. Since 6DOF sensors normally have a limited measurement range, they do not support cases wherein an object to be measured moves over a wide range. Since the sensors themselves are expensive, the price of 6DOF sensors must be reduced in order for both methods 1 and 2 to become popular.

Since method 3 does not use a 6DOF sensor, it can measure the position and orientation of the camera within a range where markers are present. Since method 3 uses only the camera, it can be implemented at a lower cost than a measurement apparatus which uses a 6DOF sensor if a general-purpose CCD camera is used. However, in order to obtain the position and orientation of the camera, markers whose positions on the physical space are given need be detected in the captured image.

In order to accurately obtain the orientation using method 3, marker images appearing in the captured image must be of a large size. By also laying out a plurality of markers in the physical space so as to ensure that those captured are of a large size, stable position and orientation measurement can be made over a broad range. Each marker must not be affected by the illumination state of the physical space so that it can be accurately detected by image processing. For this purpose, each marker is normally configured to have black and white regions.

As described above, each marker used in method 3 tends to have a large size and a black-and-white pattern. For this reason, when a plurality of large markers for position and orientation measurement (e.g., square, black-and-white markers described in D5) are laid out on the physical space, these markers may often be eyesores for people who do not use the position and orientation measurement of the camera. Also, people who do not know the significance of markers may feel they spoil the beauty of the physical space.

On a wall surface on which two-dimensional, large markers are adhered, not only the material and structure of the wall surface are hidden, but also such wall surface hardly accords with the existing design. Furthermore, it is difficult, for example, in public places to put black and white large markers for position and orientation measurement on the wall surface and structure. In order to accurately measure the position and orientation of the camera in a place that requires a long moving distance such as a corridor, passageway, and the like, a large number of two-dimensional markers must be continuously set within a range in which the camera can capture them. For example, setting a large number of markers on a public space such as an underground passage or the like requires social consensus, and it is not easy to implement this in practice. That is, not everybody may prefer large, rectangular markers adhered here and there on the wall surfaces of a public space.

When a method of estimating the orientation of the camera using an orientation sensor that uses gyro and acceleration sensors together with markers, and a method of obtaining the camera position from two marker points is adopted, the use of large markers is not required. In this case, markers need only be set to identify two points. Conventionally, it is a common practice to use a method of identifying markers based on colors. However, since the colors change under the influence of scene lighting, stable identification is difficult to attain. For this reason, since the number of colors that can be used is limited, it is difficult to identify a plurality of colors when moving the camera over a broad range. As information used to easily identify the detected marker, differences of the shapes of markers may be used. However, if the number of types of shapes increases, the differences between the shapes becomes small, and markers are indistinguishable if they are not captured in a large size. This consequently poses the same problem as with the markers used in method 3.

As methods of providing information to each marker, means for embedding information into one marker, and a method of providing information to a combination of a plurality of markers are available. As representatives of the latter method, there are many techniques for obtaining the relative position using signals based on the Maximum Length Sequence (MLS). In the Maximum Length Sequence (MLS), the information volume of each marker is often two bits, i.e., "0" or "1", and a simple sensor is normally used to read 2-bit data. In order to cover a broad range, the standard length required to generate the sequence becomes large. A region to be captured is often relatively narrow, and if the position and orientation cannot be measured unless many markers are captured at one time, the range of use is narrowed down.

As described above, in an application in which the camera used to detect the position and orientation moves over a broad range, no marker which can implement precise measurement of the position and orientation without largely spoiling the beauty of the camera moving range are available so far.

DISCLOSURE OF INVENTION

The present invention has been made in consideration of the aforementioned problems, and has as its object to provide markers which can be laid out over a broad range and have less limitations on the two-dimensional size, and to implement the position and orientation measurement of a camera using these markers.

According to the present invention, the foregoing object is attained by providing an information processing method for calculating a position and orientation of an image capturing device which captures an image of a physical space on which a plurality of markers are one-dimensional set, comprising:

a marker detection step of detecting the plurality of markers from a captured image;

a conversion step of converting the plurality of markers detected in the marker detection step into corresponding numerical information;

a collating step of collating a part, which matches the numerical information, of a predetermined code string;

a coordinate calculation step of calculating coordinate values of the plurality of detected markers on the physical space using the collating result and information associated with a layout of the markers; and a position and orientation calculation step of calculating the position and orientation of the image capturing device using a detection result in the marker detection step and the coordinate values.

According to another aspect of the present invention, the foregoing object is attained by providing an information processing apparatus for calculating a position and orientation of an image capturing device which captures an image of a physical space on which a plurality of markers are one-dimensional set, characterized by comprising:

marker detection unit which detects the plurality of markers from the captured image;

conversion unit which converts the plurality of markers detected by the marker detection unit into corresponding numerical information;

collating unit which collates a part, which matches the numerical information, of a predetermined code string;

coordinate calculation unit which calculates coordinate values of the plurality of detected markers on the physical space using the collating result and information associated with a layout of the markers; and position and orientation calculation unit which calculates the position and orientation of the image capturing device using a detection result of the marker detection unit and the coordinate values.

Further features of the present invention will become apparent from the following description of exemplary embodiments with reference to the attached drawings.

BRIEF DESCRIPTION OF DRAWINGS

FIG. 7 is a flowchart for explaining the operation of the position and orientation measurement apparatus 100 according to the embodiment.

BEST MODE FOR CARRYING OUT THE INVENTION

Preferred embodiments of the present invention will now be described in detail in accordance with the accompanying drawings.

Figure 1:
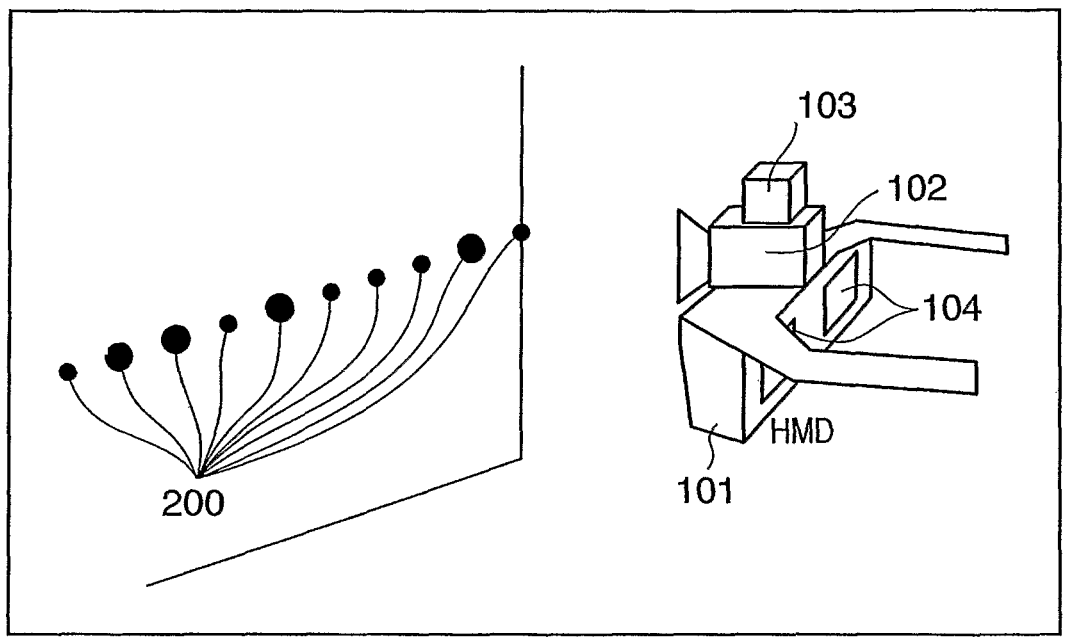
FIG. 1 is a view showing an example of the use mode upon applying a position and orientation measurement apparatus 100 according to one embodiment of the present invention applied to an HMD (Head Mounted Display) 101.

FIG. 1 is a view showing an example of the use mode upon applying a position and orientation measurement apparatus 100 according to one embodiment of the present invention applied to an HMD (Head Mounted Display) 101.

An HMD 101 has a camera 102 as a video camera which uses, e.g., a CCD sensor or CMOS sensor as an image capturing element, and an orientation sensor 103, and is movable in physical space. The HMD 101 has a pair of displays 104 for the right and left eyes, and a user who wears the HMD 101 observes images displayed on the displays 104.

The camera 102 as an example of an image capturing device is attached to the HMD 101 so that its image capture direction roughly matches the direction of the line of sight of the user who wears the HMD 101. The camera 102 captures an image of the physical space, and outputs a signal representing the captured image to a captured image acquisition unit 105 (to be described later). The orientation sensor 103 measures the tilt angle of the HMD 101 in the gravitational direction based on the principle of, e.g., a vibration gyro.

As described above, the HMD 101 shown in FIG. 1 incorporates the displays 104, and is attached with the camera 102, to which the orientation sensor 102 is fixed. This HMD 101 is freely movable in physical space, and a marker string 200 is laid out on the physical space to be observed.

Note that this embodiment uses the HMD 101 which incorporates or is attached with three components, i.e., the camera 102, orientation sensor 103, and displays 104. However, the displays 104 need not be fixed to the other two components and need not be incorporated in the HMD 101 as long as the camera 102 and orientation sensor 103 have a fixed positional relationship, and the camera is movable in physical space.

Figure 2:
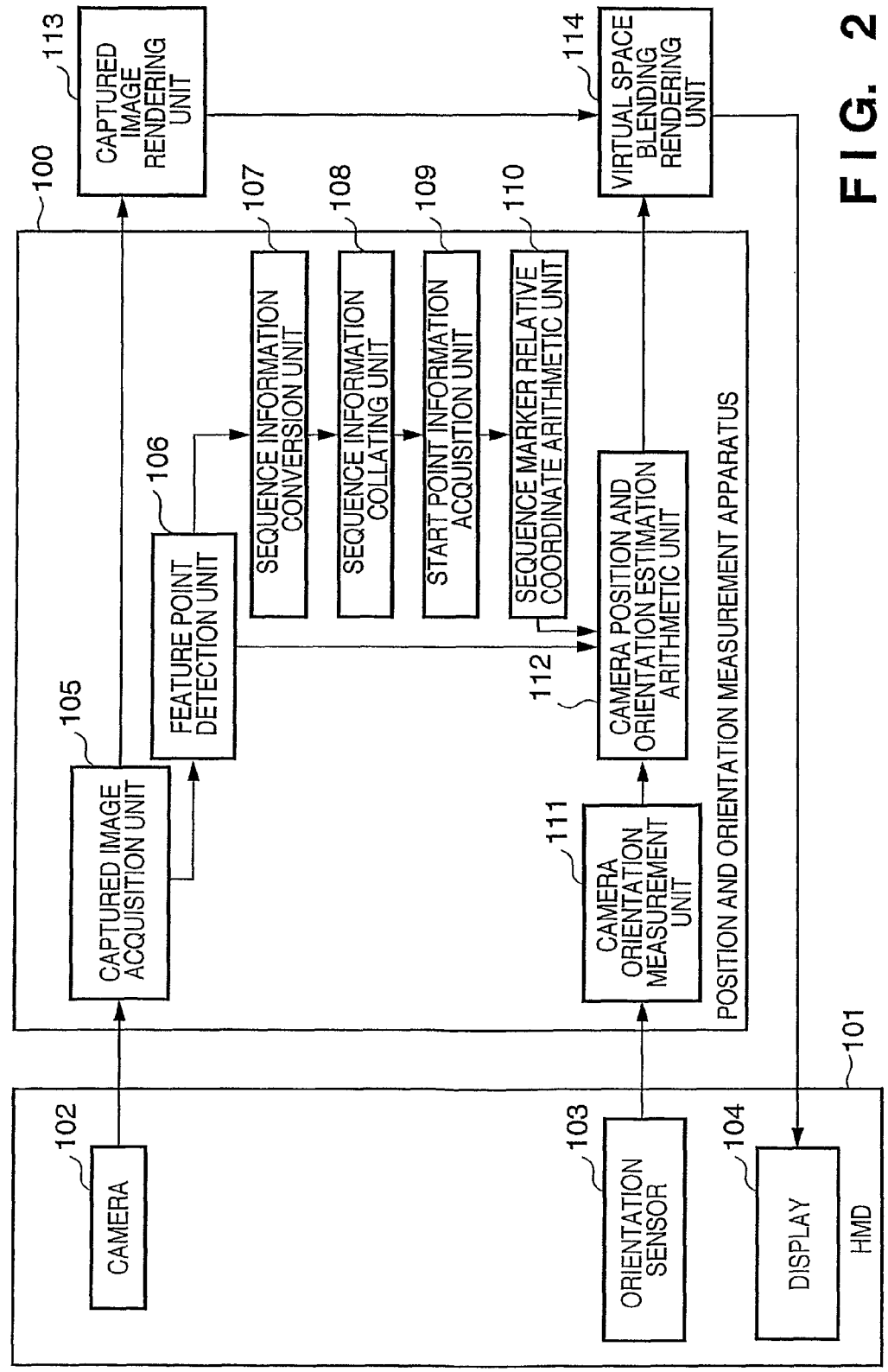
FIG. 2 is a block diagram showing an example of the functional arrangement of the position and orientation measurement apparatus 100 according to the embodiment and the HMD 101 shown in FIG. 1.

FIG. 2 is a block diagram showing an example of the functional arrangement of the position and orientation measurement apparatus 100 according to this embodiment, and the HMD 101 shown in FIG. 1. The position and orientation measurement apparatus 100 and HMD 101 may be connected to enable wireless or wired communications, or the position and orientation measurement apparatus 100 may be incorporated in the HMD 101.

The signal which is sent from the camera 102 and represents the captured image of the physical space is sent to the captured image acquisition unit 105, which serves as, for example, a video capture board and reconstructs the received signal as image data. The obtained image data is sent to a feature point detection unit 106, and also to a captured image rendering unit 113 (to be described later). The feature point detection unit 106 has a function of detecting markers on the physical space, which are included in the input image data. At this time, the positions (two-dimensional coordinates in the image) of the markers in the image are also detected.

Assume that the captured image acquisition unit 105 receives an image obtained by capturing a part of a single-dimensional marker string 200 set on the physical space.

The feature point detection unit 106 detects markers using feature quantities detected from image data, and the feature quantities can be implemented using information such as sizes, colors, and the like of the markers. Practical feature quantities will be described later. Using transcendental information, i.e., the single-dimensional layout of the marker string, processing for estimating a portion where the marker string exists from the captured image can be efficiently executed.

The feature point detection unit 106 supplies information of the detected markers to a sequence information conversion unit 107 and camera position and orientation estimation arithmetic unit 112. The sequence information conversion unit 107 calculates numerical information from the markers. A sequence information collating unit 108 compares this numerical information with reference sequence information and detects a matching part. A start point information acquisition unit 109 acquires the coordinates or the like of a start point on the physical space as information associated with the start point of encoding of sequence information. A sequence marker relative coordinate arithmetic unit 110 makes arithmetic operations for converting the coordinates of the marker string included in the image data to those on the physical space based on this coordinate information on the physical space.

This embodiment uses, as the reference sequence information (code string), a code string which includes only one autocorrelation function that yields "1" within a cycle like the Maximum Length Sequence (MLS).

A camera orientation measurement unit 111 calculates the tilt, angle in the gravitational direction based on the output from the orientation sensor 103 which is connected to an input/output port (not shown). Note that errors due to the mechanical characteristics and initial values of the orientation sensor 103 occur. However, when the gravitational direction is detected using an acceleration sensor, that sensor can also be used as an orientation sensor using an integration circuit and smoothing circuit.

The camera position and orientation estimation arithmetic unit 112 estimates the position and orientation of the camera 102 by solving simultaneous equations using:

coordinate information of the markers in the image obtained by the feature point detection unit 106;

the coordinates of the marker string on the physical space obtained by the sequence marker coordinate arithmetic unit 110; and information associated with the orientation of the camera 102 obtained by the camera orientation measurement unit 111.

The position and orientation measurement apparatus 100 with the above arrangement can be implemented by a general-purpose computer, and at least some components of the apparatus 100 can be implemented when a CPU executes control software.

Note that the captured image rendering unit 113 and a virtual space blending rendering unit 114 in FIG. 2 are used to generate a composite image of an actually captured image (real-time object image) and CG image (virtual object image)) using the camera position and orientation output from the position and orientation measurement apparatus 100 according to this embodiment. These units are described as independent components since they are examples of an arrangement that uses the result of the position and orientation measurement, and are not related to the position measurement processing.

The captured image rendering unit 113 receives image data acquired by the image acquisition unit 105 as in the feature point detection unit 106. The unit 113 renders this image data as the image capture result of the physical space itself on a display rendering area (video memory) for the displays 104 of, for example, the virtual space blending rendering unit 114.

The virtual space blending rendering unit 114 overwrites and renders a virtual space (virtual object image) on the display rendering area for the displays 104, thereby blending and rendering the virtual object image on the physical object image. More specifically, a virtual space image (virtual object image), which is obtained by rendering a virtual space model based on the position and orientation of the camera calculated by the camera position and orientation estimation arithmetic unit 112, is composited to the physical space image captured by the camera 102. In this way, an image (MR space image) that represents an MR space obtained by blending the physical space and virtual space is generated.

The virtual space blending rendering unit 114 sends the MR space image to the displays 104 incorporated in the HMD 101. In this way, the displays 104 display the blending rendering result.

As described above, the position and orientation measurement apparatus 100 of this embodiment can be equipped at an arbitrary position irrespective of the moving range of the HMD 101 as long as it can receive a video signal from the camera 102 of the HMD 101 and a detection signal from the orientation sensor 103. Therefore, the position and orientation measurement apparatus 100 is suited to the position and orientation measurement over a broad range unlike an arrangement, the measurable range of which is limited such as a 6DOF sensor that uses magnetism.

Figure 3:
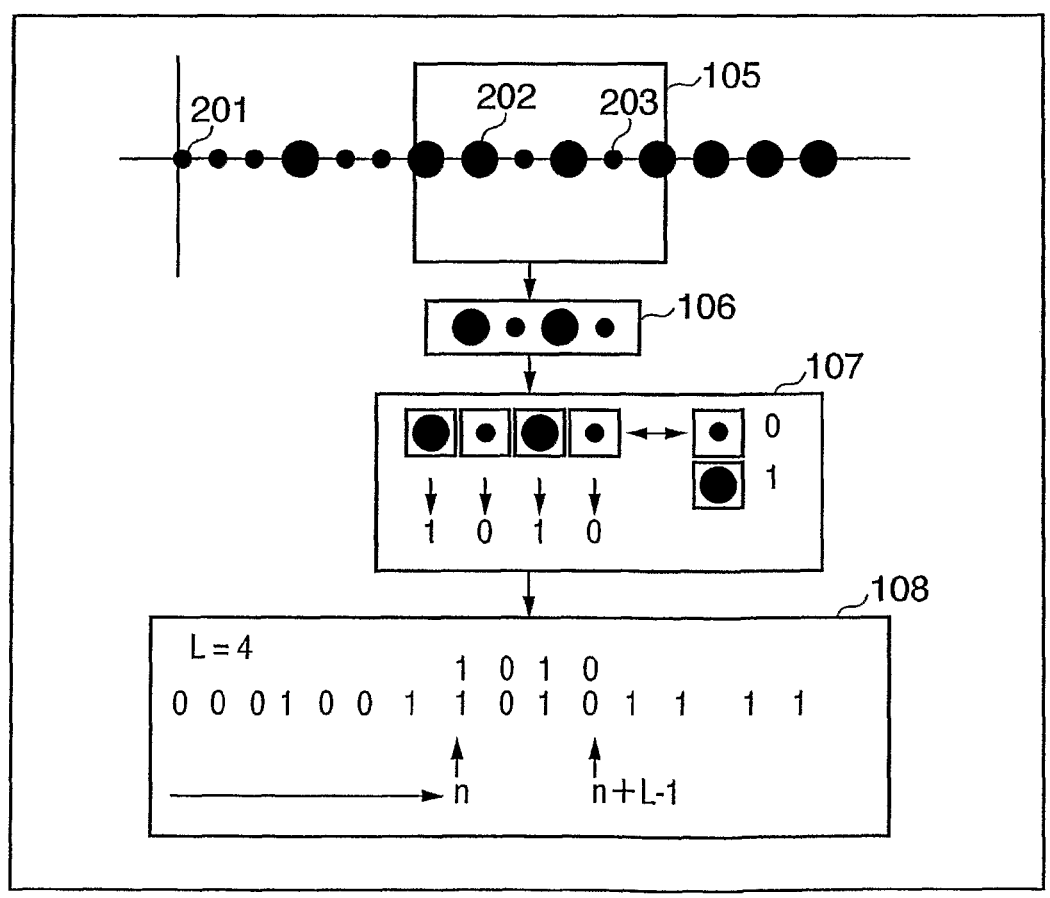
FIG. 3 is a view for explaining an operation for obtaining sequence information from a marker string in the embodiment.

The operation for obtaining sequence information from the marker string will be described below using FIG. 3.

The marker string uses an information string obtained by coding position information or the like by encoding. Assume that the marker string includes a start point 201 of encoding, and a series of markers are arranged at equal intervals from there. Also, assume that markers 202 to 203, which are arranged on a line, of such marker string are captured in image data acquired by the captured image acquisition unit 105. Note that the "marker is captured" when the image of the entire marker is captured.

The feature point detection unit 106 estimates regions of markers using feature quantity detection of the markers from the image data. For example, the shapes, colors, and the like of markers may be used as their features. The feature point detection unit 106 can detect the position of each marker in the captured image as one point by calculating the barycenter of a region detected by feature information of that marker. Alternatively, the unit 106 may calculate an outer frame of a region detected as the marker, and may calculate the barycenter or center of that outer frame. Furthermore, when the design (layout) of one-dimensional arranging markers is known in advance as information, a method of correcting the coordinate value of each marker using a relative value from the baseline of the marker string by the feature point detection unit 106 may be adopted.

The sequence information conversion unit 107 registers correspondence between codes and graphics of markers, and compares the markers obtained from the feature point detection unit 106 one by one to convert each marker into numerical information associated with position information used in encoding. For example, in FIG. 3, the unit 107 converts a large circle into numerical information "1", and a small circle into numerical information "0".

In an environment in which the direction of image capture of the camera agrees with the normal direction of a wall surface on which the marker string is set, the marker string in the captured image can be easily compared with a reference graphic (standard graphic). However, in general position and orientation measurement of a camera, since the positional relationship between the image capture direction of the camera and the wall surface on which the marker string is set is arbitrary, an image of the marker string is often obliquely captured.

Figure 4A:
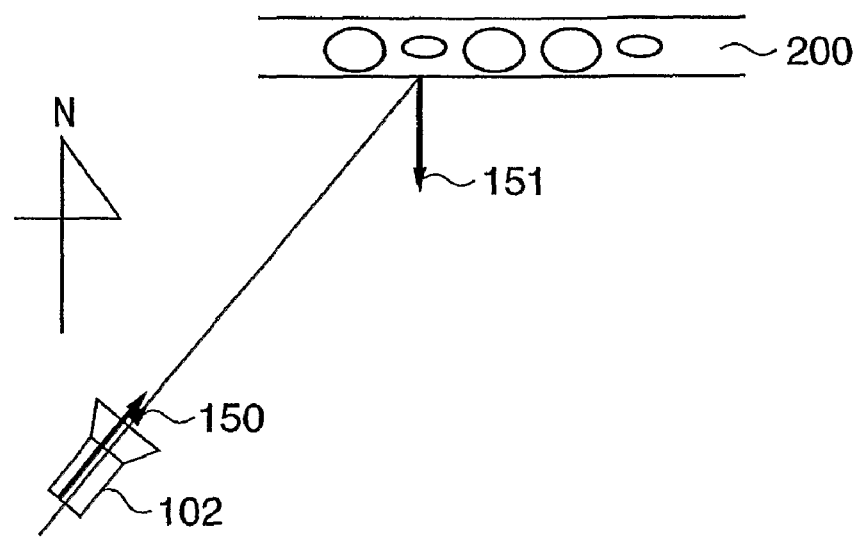
FIG. 4A is a top view showing a state in which a camera 102 obliquely captures an image of a marker string 200.

FIG. 4A is a top view showing a state in which the camera 102 obliquely captures an image of a marker string 200. FIG. 4A shows a look-down state of the camera 102 and marker string 200, so that the marker string 200 can be seen.

Figure 4B:
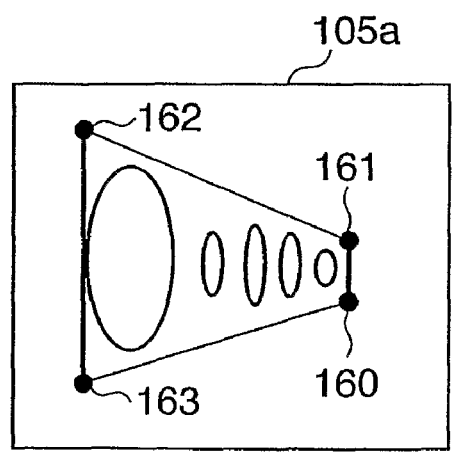
FIGS. 4B and 4C are views for explaining keystone distortion correction.

In FIG. 4A, the camera 102 captures an image of the marker, string 200 toward the northeast. In this case, in a captured image 105a, the marker string 200 appears askew, as shown in FIG. 4B. In this state, when circles having different sizes are used as elements which form the marker string, it is difficult to discriminate each individual marker. Hence, a region which circumscribes the marker string and is bounded by vertices 160 to 163 undergoes keystone distortion correction, thus stably distinguishing the shape of the marker string, and converting each marker into numerical information (sequence information).

A keystone region bounded by the vertices 160 to 163 is originally a rectangular region, and two lines, i.e., a line which couples the vertices 162 and 161 and that which couples the vertices 163 and 160, are parallel to each other. Furthermore, by estimating the number of markers included in the region from a projection feature as a projection to a line in the vertical direction, since the physical intervals of markers are given, the ratio of the length in the long direction to that in the short direction of the rectangle can be obtained. After the ratio of the lengths is obtained, the keystone distortion correction can be implemented. Hence, by correcting the region in the captured image to a rectangle, as denoted by 107a in FIG. 4C, the obliquely captured image of the marker string can be converted into sequence information.

Furthermore, an optical axis direction 150 of the camera 102, a normal direction to the wall surface on which the marker string 200 is set, and the areas of markers which form the marker string are given. Hence, the region of the marker string can be corrected with high precision using these pieces of information.

The sequence information collating unit 108 which collates the obtained numerical information and information of an encoded sequence detects the collating positions. For example, when a standard length (L) of encoding is 4, if four points or more of markers are obtained from the markers 202 to 203, a code sequence can be collated from the converted numerical information. Let n be the collating start position from the start point. Then, the end position is given by n+L−1. Note that it is effective to use an encoding method based on the Maximum Length Sequence (MLS) when the marker string is set over a broad range, since a maximum matching cycle of the standard length L can be assured. The Maximum Length Sequence (MLS) is configured to maximize its cycle by a shift register of the standard length (L) of encoding and feedback of the register output.

Note that the aforementioned sequence information collating unit 108 uses the Maximum Length Sequence (MLS) to support use over a broad range in the above description. However, for example, when a region where the marker string is set is narrow, a table that stores a code string may be looked up to detect numerical information from the table.

Figure 5:
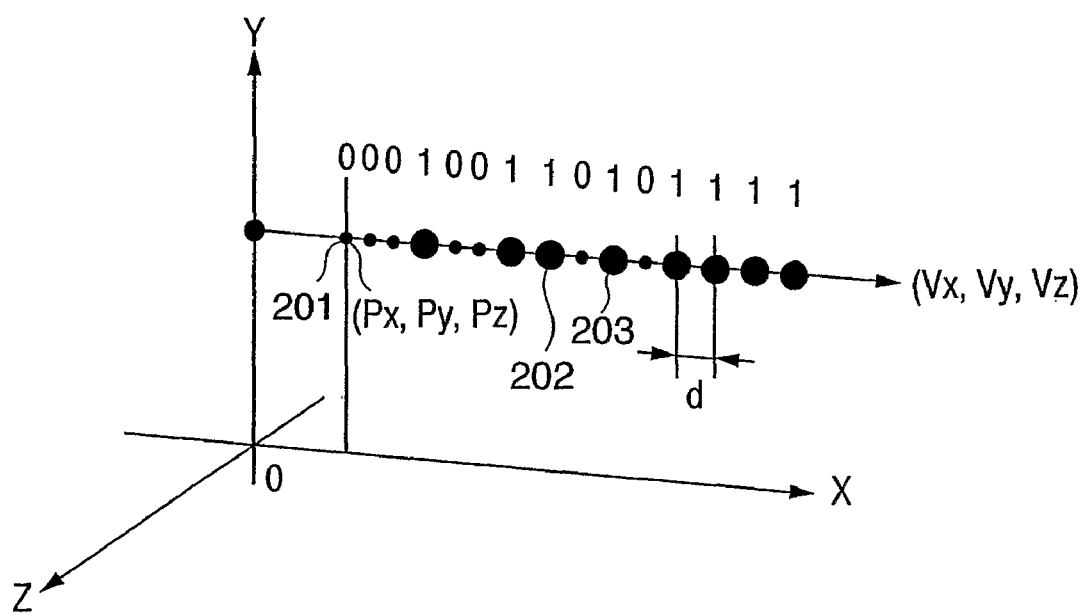
FIG. 5 is a view for explaining the processing of a start point information acquisition unit 109 and sequence marker relative coordinate arithmetic unit 110 in the embodiment.

The processing of the start point information acquisition unit 109 and sequence marker relative coordinate arithmetic unit 110 will be described below using FIG. 5.

As start point information associated with the start point 201 of the marker string, a coordinate position (Px, Py, Pz) of the start point on the physical space, direction components (Vx, Vy, Vz) of the marker string from the start point, and a length (d) between markers on the physical space are available. Assume that the direction components (Vx, Vy, Vz) are normalized on the same coordinate system as the length (d) on the physical space.

The start point information acquisition unit 109 acquires associated start point information from information obtained by the sequence information collating unit 108. Alternatively, the start point information may be held in a table or the like in advance, or may be acquired by sending an inquiry to a server that manages the start point information via a wireless or wired network.

The sequence marker relative coordinate arithmetic unit 110 calculates the coordinates, on the physical space, of the marker string included in the image captured by the camera based on the start point information obtained from the start point information acquisition unit 109. For example, since the marker 202 in FIG. 3 is laid out as the (n)-th marker from the coordinates (Px, Py, Pz) of the start point 201 on the physical space to have a length of the marker intervals (d) and the direction (Vx, Vy, Vz) from the start point, the coordinates of the marker 202 on the physical space are calculated as (Px+d×n×Vx, Py+d×n×Vy, Pz+d×n×Vz).

The (n)-th marker with respect to the direction components (Vx, Vy, Vz) from the start point 201 may be expressed as (Vx(n), Vy(n), Vz(n)). When the direction components include, for example, a sine wave, the marker string can be set in a sine wave pattern (the coordinates of the marker string laid out in the sine wave pattern can be calculated). Also, the coordinates of the (n)-th marker may be registered in a table, and can be obtained by looking up the table.

An embodiment of the start point information acquisition unit 109 in a general environment has been explained. By taking correspondence with one or more tables which hold the collating positions in the sequence information collating unit 108 and the coordinate values of the marker string on the physical space, the coordinate values can be efficiently obtained. In this case, the processing of the sequence marker relative coordinate arithmetic unit 110 can be omitted.

Figure 6:
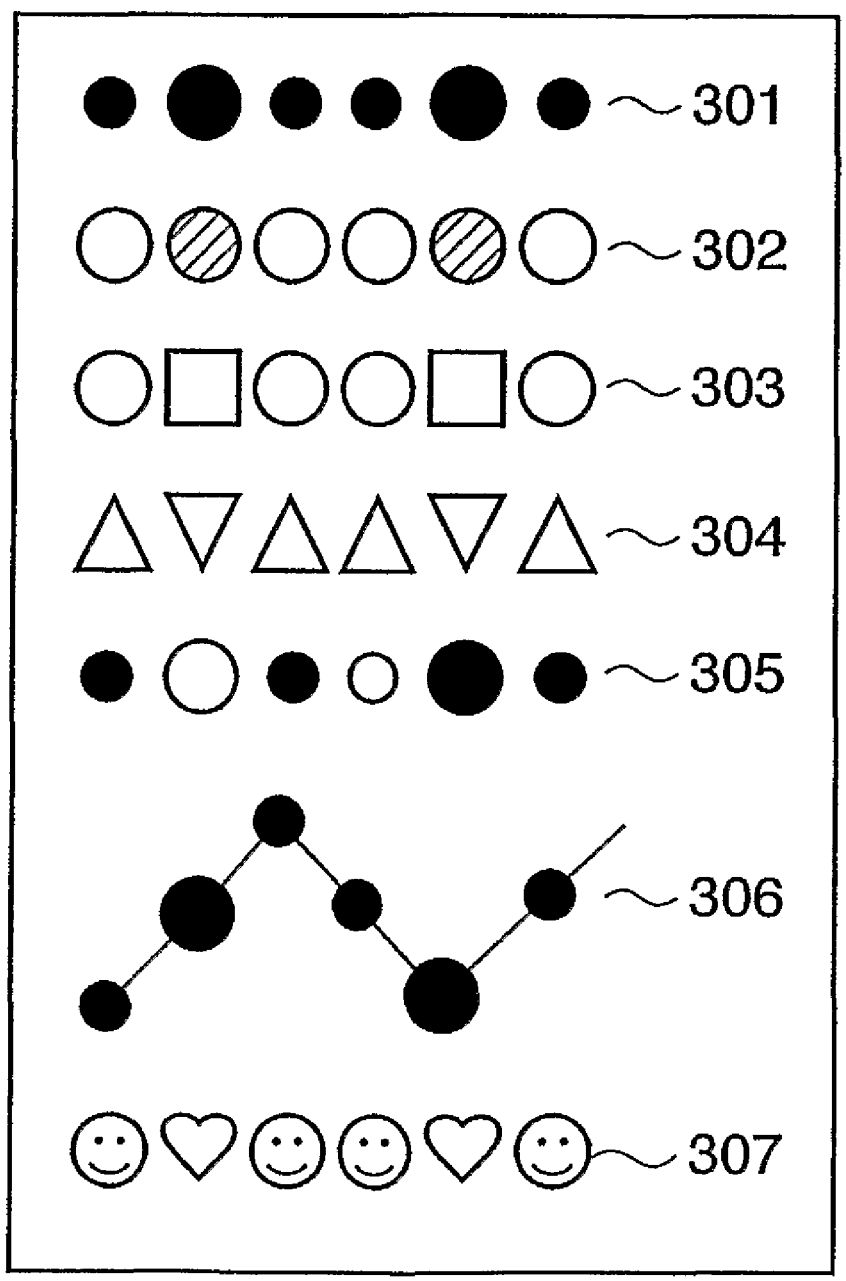
FIG. 6 shows examples of marker strings that can be used in the embodiment.

FIG. 6 shows examples of marker strings. A marker string 301 has basic graphics such as circles, and values according to sizes are assigned such as a large circle="1" and a small circle="0". In other words, the marker string 301 expresses values "1" and "0" as the sizes of the markers.

In this way, this embodiment uses a plurality of different types of markers in features that can be identified by image processing, and converts numerical information like a code string into image information.

A marker string 302 is an example which uses markers with different colors to have circles as basic graphics. A marker string 303 is an example using circular and square markers as basic graphics. A marker string 304 is an example that uses markers having two features, i.e., an example that uses markers having different sizes and colors to have circles as basic graphics.

A marker string 305 can be considered as a string including two different marker classes, i.e., two different types of markers which are blank circles and have different sizes (class 1), and two different types of markers which are full circles and have different sizes (class 2). Therefore, class 1 and class 2 can express different kinds of information. In this case, since class 1 and class 2 are independently processed upon conversion into numerical information, the marker string 305 can be processed as a string on which information (e.g., original numerical information) expressed by class 1 and information (e.g., error correction information) expressed by class 2 are multiplexed. Of course, the marker string 305 may express one kind of information. In this case, since marker string 305 includes four different types of markers, the information size per type can be increased from 1 bit ("1" or "0") to 2 bits (one of "00", "01", "10", and "11"). For this reason, the number of markers required to express identical numerical information can be reduced.

The types of markers of a marker string 306 are common to those of the marker string 301, but markers are laid out not linearly but in a regular triangular wave pattern. By registering the shape (an angle and the length of one side) of the triangular wave in advance, such a nonlinear layout is available. A marker string 307 is common to the marker string 303 since it has different markers as basic graphics (outer shapes), but it has more complicated outer shapes.

As in these examples, in this embodiment, a marker string can be configured by two or more types of markers having at least different features that can be identified by the image processing. For this reason, markers smaller than large-size markers having two-dimensional patterns such as barcodes and the like can be used. Also, markers having natural appearances can be used.

Multiplexing has an effect of shortening the marker string which must be detected in practice when the required standard length (L) becomes large. Note that FIG. 6 shows examples of markers which have different features that can be theoretically identified by image processing. Hence, the sizes, colors, densities, and the like of basic graphics for markers to be used actually must be determined in consideration of a real environment (especially, the type and brightness of a light source), the performance of the image capturing unit and image processing, and the like.

If the standard length (L) of encoding is sensed as one group, since two points, i.e., the start and end positions thereof can be obtained, all markers need not be continuously laid out at equal intervals. That is, a blank or a marker string based on another encoding may be interposed between one marker string corresponding to the standard length (L) and another marker string.

A code string expressed by markers may have a plurality of pieces of information (multiplexed encoded sequence). More specifically, when a plurality of pieces of information associated with reference points such as the standard point and start point of a marker string on the physical space are multiplexed and encoded to express a marker string, that marker string can be used as information in the aforementioned start point information acquisition unit 109. Since detection errors in image processing may occur, information used to correct or detect errors may be multiplexed and encoded to be included in the information of the marker string, thus allowing reliable detection of the information.

Furthermore, when geographical information around the marker string, e.g., information associated with a geographic name, location of communal facilities, and the like is included in encoded information, it can be used in a navigation process after the position and orientation of the camera are detected.

The operation of the position and orientation measurement apparatus 100 will be described below with reference to the flowchart shown in FIG. 7.

Steps S101 and S102 are executed in parallel. In step S101, the orientation of the camera 102 is acquired from the orientation sensor 103. Since the information of the orientation sensor 103 is updated independently of the position and orientation measurement apparatus 100, the latest updated state is acquired in step S101.

In step S102, processing for acquiring a video signal from the camera 102 by the captured image acquisition unit 105 is executed. The camera 102 is capturing a moving image at a predetermined frame rate (e.g., 30 frames/sec). The captured image acquisition unit 105 acquires an image signal for one frame of a plurality of continuous frames, and converts the image signal into digital data, thus generating image data in step S102.

The feature point detection unit 106 detects in step S103 if the image data generated in step S102 includes a marker string. If the image data does not include any marker string (step S104, NO), since the coordinates of markers on the physical space cannot be calculated, the position and orientation estimation of the camera 102 is disturbed. Hence, a change in camera orientation is estimated based on a plurality of previous detection results, and only correction by orientation rotation is applied (step S112). For example, a change in camera orientation can be estimated from two or more most recent detection results.

Figure 4C:
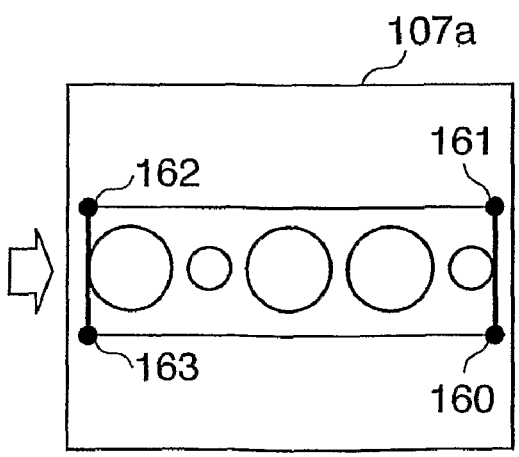

If the marker string is detected in the image data (step S104, YES), the keystone distortion correction processing shown in FIGS. 4B and 4C is executed (step S105). The keystone distortion correction can be implemented by exploiting the fact that the direction of image capture obtained from the orientation of the camera 102 detected by the orientation sensor 103, and the normal to the wall surface on which the marker string is laid out are given. Even when the direction of the normal to the wall surface on which the markers are set or the direction of image capture of the camera 102 are unknown, the keystone distortion correction processing can be done by applying correction so that a circumscribing quadrangle of the captured marker string becomes a rectangle. Even when the marker string is laid out nonlinearly, correction can be done using given layout information and a circumscribing shape of markers.

Using the captured image that has undergone the keystone distortion correction processing, the sequence information conversion unit 107 converts the marker string into numerical information in step S106. In step S107, the sequence information collating unit 108 collates a predetermined code string (sequence information) and the numerical information (numerical string). More specifically, whether or not the code string includes the numerical string is detected, and if the code string includes the numerical string, the position of the numerical string is detected. Note that, as shown in FIG. 6 as examples of marker strings, the multiplexed encoding technique which uses a marker string as a combination of a plurality of features of markers that can be detected by image processing, and provides a plurality of pieces of encoded information to the marker string can be used. By appending error detection or error correction information associated with encoding to information represented by the marker string as additional information, the detection precision of the processing in the sequence information collating unit 108 can be improved.

It is checked as a result of collating in step S107 if the numerical information matches the sequence information (step S108). If no match is detected, the detected marker string may not be that within the range of use or the marker string may be erroneously detected. If collating has failed, a change in orientation is estimated from the previous detection results, and correction is made in step S112 as in the case in which no marker string is detected in step S104.

On the other hand, if a part that matches the numerical information in the sequence information is detected (step S108, YES), the start point information acquisition unit 109 acquires start point information of encoding (the coordinate value of the start point position on the physical space and the like) (step S109). The start point information acquisition unit 109 may send an inquiry about information associated with a reference point and position, or may acquire information associated with the start point using encoded information multiplexed in the marker string.

In step S110, the sequence marker relative coordinate arithmetic unit 110 calculates the coordinates of the marker string detected in step S103 on the physical space. That is, the coordinates of the respective markers are calculated by the aforementioned method using given information associated with the layout of markers (in this case, the start point information obtained from the start point information acquisition unit 109, and information associated with the layout direction of markers and marker intervals), and the information of the position of appearance of the numerical information in the sequence information. Note that the information about the normal to the wall surface on which the markers are laid out, and the features (shapes, colors, and the like) of the markers which can be identified by image processing are included in the given information associated with the layout of markers.

A vector (Vx, Vy, Vz) indicating the direction of the marker string from the start point, and the distance (d) between neighboring markers can also be handled as a function associated with the collating position (n). In this case, they are expressed as direction components (Vx(n), Vy(n), Vz(n)), and distance (d(n)). When a function expression is used, as described above, the marker string can be laid out along a curve by introducing a trigonometric function in the direction components. The coordinates of the start point 201 on the physical space need not always be the absolute position, and may be a relative position from another marker or may be a given position in a region where the position and orientation estimation is made.

In step S111, the position and orientation of the camera are estimated by solving linear simultaneous equations having the position information of the camera as the unknown, using:
- the coordinates on the physical space associated with two or more points of markers whose positions on the physical space are calculated in step S110;
- the coordinates on the captured image of these two or more points of markers (detected in step S102); and
- the orientation of the camera detected by the orientation sensor 103 (detected in step S101).

The process of calculating the position and orientation of the camera from the linear simultaneous equations will be explained below. The relationship between a world coordinate system (X) indicating the physical space on which the marker string is set, and a camera coordinate system (x) around the camera 102 will be explained first. The coordinate transformation from the coordinate of the world coordinate system X to those of the camera coordinate system x can be expressed, using a three-dimensional vector t which represents the position of the origin of the world coordinate system X viewed from the camera coordinate system x, and a rotational transformation matrix R which represents the orientation of the world coordinate system X viewed from the camera coordinate system x, by:

$$x = RX + t \quad (1)$$

The transformation that obtains a marker position projected from that on the camera coordinate system x onto the image capture plane of the camera is called perspective transformation. Assume that the optical axis of the camera agrees with the center of the image capture plane, and let fx be the focal length in the horizontal direction, and fy be that in the vertical direction. Then, a position $x = [x_c, y_c, z_c]^t$ of a marker on the camera coordinate system x is projected onto two-dimensional image coordinates $u = [u_x, u_y]$ of the image capture plane by the perspective transformation.

$$u_x = -f_x \frac{x_c}{z_c} \quad (2)$$

$$u_y = -f_y \frac{y_c}{z_c}$$

If the position of the world coordinate system W on the camera coordinate system x is given by $t = [t_x, t_y, t_z]^t$, and the rotational transformation matrix R is given, as a 3×3 matrix, by:

$$R = \begin{bmatrix} R_{11} & R_{12} & R_{13} \\ R_{21} & R_{22} & R_{23} \\ R_{31} & R_{32} & R_{33} \end{bmatrix} \quad (3)$$

from equations (1), (2), and (3), since a point whose position on the world coordinate system is $X = [x_w, y_w, z_w]^t$ is projected onto two-dimensional image coordinates $u = [u_x, u_y]$ by perspective projection transformation, these coordinates satisfy:

$$u_x = -f_x \frac{R_{11}x_w + R_{12}y_w + R_{13}z_w + t_x}{R_{31}x_w + R_{32}y_w + R_{33}z_w + t_z} \quad (4)$$

-continued $$u_y = -f_y \frac{R_{21}x_w + R_{22}y_w + R_{23}z_w + t_y}{R_{31}x_w + R_{32}y_w + R_{33}z_w + t_z}$$

Furthermore, if $u'_x = -u_x/f_x$ and $u'_y = -u_y/f_y$, equations (4) can be expressed as:

$$u'_x = \frac{R_{11}x_w + R_{12}y_w + R_{13}z_w + t_x}{R_{31}x_w + R_{32}y_w + R_{33}z_w + t_z} \quad (5)$$

$$u'_y = \frac{R_{21}x_w + R_{22}y_w + R_{23}z_w + t_y}{R_{31}x_w + R_{32}y_w + R_{33}z_w + t_z}$$

When three components, i.e., the tilts in two directions in the direction of the gravity axis, and an azimuth component in the direction of the earth axis, are obtained by the orientation measurement of the camera, since the orientation of the camera on the world coordinate system is given, the rotational transformation matrix R is similarly given. Hence, when equations (5) are rearranged to their left-hand sides for $t = [t_x, t_y, t_z]^t$ as the position of the camera, they can be expressed as:

$$t_x - u'_x t_z = u'_x(R_{31}x_w + R_{32}y_w + R_{33}z_w) - R_{11}x_w - R_{12}y_w - R_{13}z_w$$

$$t_y - u'_y t_z = u'_y(R_{31}x_w + R_{32}y_w + R_{33}z_w) - R_{21}x_w - R_{22}y_w - R_{23}z_w \quad (6)$$

Since an unknown variable is $t = [t_x, t_y, t_z]^t$, if the captured image includes two or more two-dimensional image coordinates $u' = [u'_x, u'_y]$ of markers, $t = [t_x, t_y, t_z]^t$ can be calculated by solving simultaneous equations (6). Furthermore, the position $t_w = [t_{wx}, t_{wy}, t_{wz}]$ of the camera on the world coordinate system can be obtained from:

$$t_w = -R^{-1}t \quad (7)$$

As described above, according to this embodiment, the markers are laid out to express a predetermined code string by a plurality of continuous markers. The markers which form a marker string include at least two types of markers having different features that can be identified by image processing. Markers detected in the captured image are converted into numerical information, and are identified based on the numerical information and the predetermined code string. Using the coordinate information of a reference marker, which is registered in advance, the coordinate information of each identified marker is calculated. The position and orientation of the camera are obtained using the calculated coordinate information and the orientation information of the camera, which is acquired separately.

In this embodiment, since the type of marker need only be specified from an image, a smaller marker can be used than a case wherein a complicated, two-dimensional image pattern such as a barcode or the like is provided to a marker, and must be recognized, and feelings of unnaturalness upon setting the markers on the physical space can be reduced. Since the markers are more likely to be recognized as a pattern on the wall surface, feelings of unnaturalness can also be reduced.

Furthermore, the position and orientation of the camera can be measured by only the position and orientation measurement apparatus, and can be obtained over a broad range. In addition, since no 6DOF sensor is required, the problems of the measurement range, setting, and price of the 6DOF sensor can be solved.

(Other Embodiments)

The above embodiment has explained the position and orientation measurement apparatus configured by a single piece of equipment. However, the equivalent functions may be implemented by a system configured by a plurality of pieces of equipment.

The above embodiment has explained only the case wherein the position and orientation measurement apparatus according to the present invention is applied to position and orientation detection of the camera provided to the HMD. However, the position and orientation measurement apparatus according to the present invention includes two devices, i.e., a device for capturing an image of a marker string on the physical space, and a device for detecting the orientation of the camera, and positional relationship of the two need only be fixed. For example, when a portable phone or the like, which has a camera and orientation sensor, executes a program that can implement the present invention, the same effects can be obtained.

The above embodiment has explained only the case wherein the orientation sensor which detects the orientation of the camera to be detected is used. However, the orientation need not be detected directly. If information (e.g., a change amount of the orientation) that can be used to estimate the position and orientation at this time is obtained from at least previously obtained positions and orientations, an arbitrary sensor can be used in place of the orientation sensor. Such information is called orientation information.

For example, another camera whose positional relationship is fixed captures an image in a vertical direction to the camera whose orientation is to be detected or captures an image of a marker whose direction is given, and the orientation of the camera can be calculated based on the position of that marker. Likewise, when the image captured by the camera 102 includes such markers, the same processing can apply.

Using another device set on the physical space to detect the orientation of the camera, only the orientation of the camera can be detected. For example, a marker (marker for orientation detection) which has a given positional relationship with the optical axis of the camera is set, and its image is captured by another camera set on the physical space and undergoes image processing, thus obtaining the orientation of the camera.

When the camera is supported by an arm or the like, the orientation of the camera can be obtained from the value of a joint angle of the arm. Furthermore, the orientation measurement result can be improved by combining a plurality of orientation detection results.

Furthermore, in the above embodiment, a plurality of position and orientation measurement methods with different precisions may be selectively used for a fixed region which requires higher precision, and a region which does not require high precision during movement.

The above embodiment has explained the condition in which only one marker string is laid out. Alternatively, a plurality of marker strings may be set in an environment. Furthermore, when the camera detects a plurality of these marker strings, the position and orientation measurement can also be implemented by executing processing using them.

The aforementioned embodiment can be implemented by software by a computer (or a CPU, MPU, or the like) of a system or apparatus.

Therefore, a computer program itself supplied to and installed in the computer to implement the functional processing of the present invention using the computer implements the present invention. That is, the present invention includes the computer program itself for implementing the functional processing of the present invention.

In this case, the form of the program is not particularly limited, and an object code, a program to be executed by an interpreter, script data to be supplied to an OS, and the like may be used as long as they have the program function.

In this case, the computer program which implements the functional processing of the present invention on a computer is supplied to the computer via a storage medium or wired/wireless communications. As the storage medium for supplying the program, for example, magnetic recording media such as a flexible disk, hard disk, magnetic tape, and the like, optical/magneto-optical storage media such as an MO, CD, DVD, and the like, a nonvolatile semiconductor memory, and so forth may be used.

As a program supply method using the wired/wireless communications, a method using a server on a computer network is available. In this case, a server stores a data file (program data file) that can be a computer program which forms the present invention. The program data file may have an executable format or may be source codes.

Then, the program data file is supplied by downloading to a client computer that has accessed the server. In this case, the program data file may be segmented into a plurality of segment files, which may be allocated on different servers.

That is, the present invention includes a server apparatus which provides the program data file for implementing the functional processing of the present invention on the computer to the client computer.

Also, a storage medium, which stores the encrypted computer program of the present invention, may be delivered to the user, and key information required to decrypt the encrypted program may be supplied to the user who meets a predetermined condition, so as to allow for installation of the computer program on a computer of the user. The key information can be supplied to the user by making him or her download it from a home page via, for example, the Internet.

The computer program for implementing the functions of the embodiments on the computer may implement them using the functions of an OS which already runs on the computer.

Furthermore, at least some functions of the computer program which forms the present invention may be provided as firmware of an expansion board or the like attached to the computer, and the functions of the embodiments may be implemented using a computer of the expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-100382, filed Mar. 31, 2006, which is hereby incorporated by reference herein in its entirety.

The invention claimed is:

1. An information processing method for calculating a position and orientation of an image capturing device which captures an image of a physical space in which a sequence of markers are arranged on a line, comprising:

detecting a sequence of markers from a captured image;
   converting the detected sequence of markers into a corresponding sequence of numerical information that indicates positions of the markers;
   collating a part of a predetermined code string that matches the sequence of numerical information to obtain a collating result;
   calculating respective coordinate values of the detected sequence of markers in the physical space using the collating result and given information associated with a layout of the sequence of markers; and calculating the position and orientation of the image capturing device using image coordinate values of the detected sequence of markers in the captured image, the coordinate values of the detected sequence of markers in the physical space, and the orientation information of the image capturing device acquired by an arbitrary sensor.

2. The method according to claim 1, further comprising correcting a distortion of an image region which includes the detected sequence of markers,
wherein converting the detected sequence of markers includes performing the conversion using an image after the correction is made.

3. The method according to claim 1, wherein converting the detected sequence of markers includes identifying a type of each of the detected markers.

4. The method according to claim 3, wherein converting the detected sequence of markers includes classifying the detected markers into types, and converting each type of marker into different numerical information.

5. The method according to claim 3, wherein the identified type includes a size of each of the detected markers.

6. The method according to claim 1, wherein the given information associated with the layout of the detected sequence of markers includes at least one of information associated with a layout direction of markers, information associated with an interval between neighboring markers, and coordinates of a reference marker in the sequence of markers.

7. The method according to claim 1, wherein the predetermined code string is a code string in which only one autocorrelation function yields "1" within a cycle.

8. The method according to claim 1, wherein the sequence of numerical information indicates an order in which the sequence of markers are positioned.

9. A non-transitory computer-readable recording medium containing computer-executable instructions for calculating a position and orientation of an image capturing device which captures an image of a physical space in which a sequence of markers are arranged on a line, the medium comprising:
    computer-executable instructions for detecting the sequence of markers from a captured image;
    computer-executable instructions for converting the detected sequence of markers into a corresponding sequence of numerical information that indicates positions of the markers;
    computer-executable instructions for collating a part of a predetermined code string that matches the sequence of numerical information to obtain a collating result;
    computer-executable instructions for calculating respective coordinate values of the detected sequence of markers in the physical space using the collating result and given information associated with a layout of the sequence of markers; and
    computer-executable instructions for calculating the position and orientation of the image capturing device using image coordinate values of the detected sequence of markers in the captured image, the coordinate values of the detected sequence of markers in the physical space, and the orientation information of the image capturing device acquired by an arbitrary sensor.

10. An information processing apparatus for calculating a position and orientation of an image capturing device which captures an image of a physical space in which a sequence of markers are arranged on a line, comprising:
    a marker detection unit which detects the sequence of markers from the captured image;
    a conversion unit which converts the detected sequence of markers detected by the marker detection unit into a corresponding sequence of numerical information;
    a collating unit which collates a part of a predetermined code string that matches the sequence of numerical information to obtain a collating result;
    a coordinate calculation unit which calculates respective coordinate values of the detected sequence of markers in the physical space using the collating result and given information associated with a layout of sequence of markers; and
    a position and orientation calculation unit which calculates the position and orientation of the image capturing device using image coordinate values of the detected sequence of markers in the captured image, the coordinate values of the detected sequence of markers in the physical space, and the orientation information of the image capturing device acquired by an arbitrary sensor.

* * * * *